Figures 1, 2:
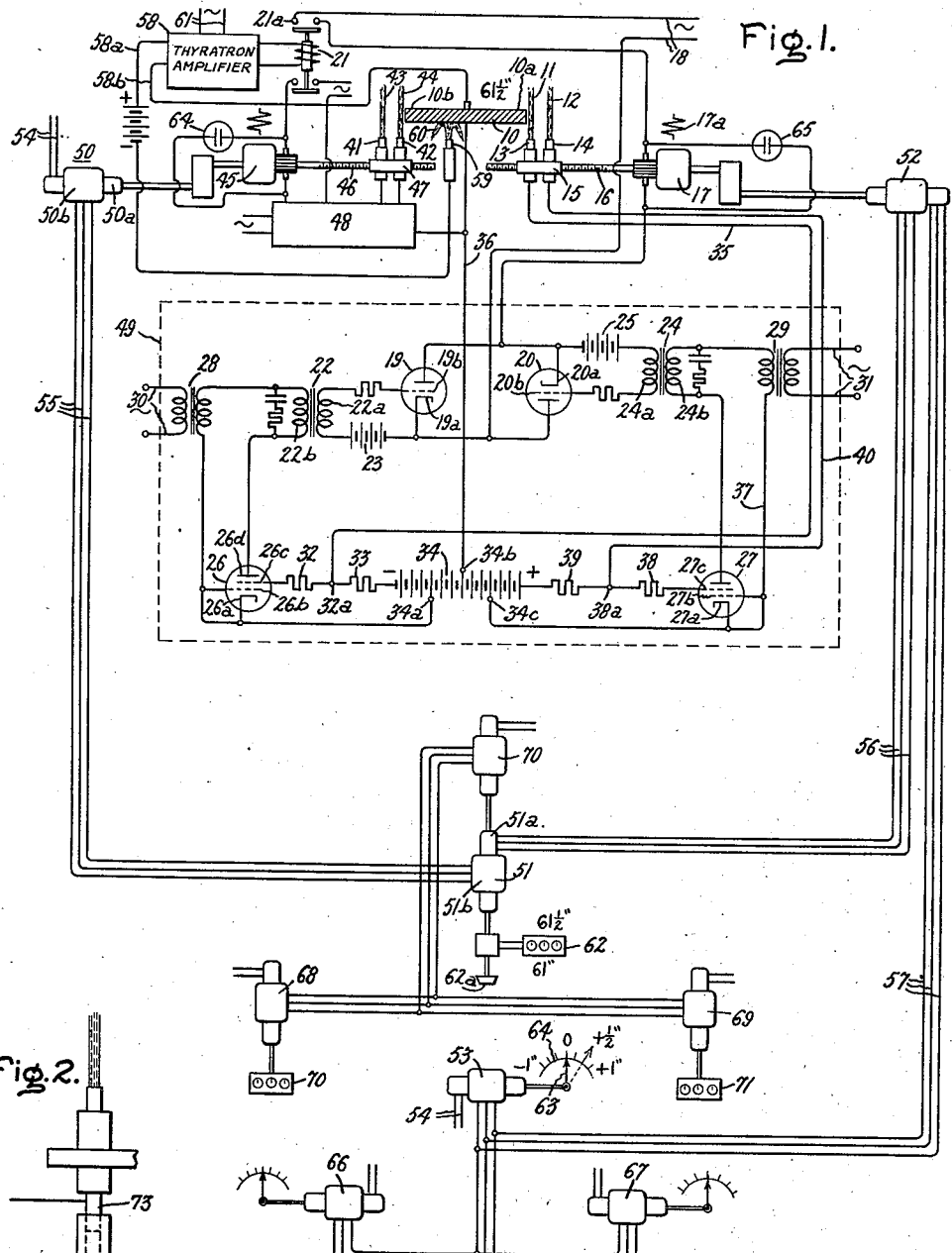

June 8, 1943.  L. L. HOLMES, JR., ET AL  2,321,386
POSITION INDICATING DEVICE
Filed Oct. 5, 1942

Inventors:
Lowell L. Holmes Jr.,
Orrin W. Livingston,
by Harry E. Dunham
Their Attorney.

UNITED STATES PATENT OFFICE 2,321,386

POSITION INDICATING DEVICE

Lowell L. Holmes, Jr., and Orrin W. Livingston, Scotia, N. Y., assignors to General Electric Company, a corporation of New York Application October 5, 1942, Serial No. 460,888

16 Claims. (Cl. 33—125)

This invention relates to indicating devices, more particularly to devices for indicating variations in the position of the edge of an object of electrical conducting material such as a strip of steel, and it has for an object the provision of a simple, reliable, and improved device of this character.

Another aspect of the invention is the combination of two edge position indicating devices arranged in proximity to opposite edges of an object of conducting material and connected so that the indications are algebraically added to indicate the width and changes in width of the object.

Another object of the invention is the provision of an indicating device of the character described which may be used to indicate the position of an edge or the width of a stationary object or of an object which moves from side to side in the direction of its width, or shifts up and down and which varies in thickness and in width, such for example as a hot strip of steel which is being reduced in a rolling mill. In this connection, the invention is particularly suited to the continuous measurement of the width of a moving web or strip.

Other objects of the invention are the provision of an indicating device of the character described which is rugged and able to withstand considerable physical injury without impairment of its accuracy and which will not be damaged by excessive heat, or mechanical friction, and which will give an accurate indication irrespective of atmospheric conditions encountered in steel mill operation, such as smoke, scale, moisture, and dirt. In carrying the invention into effect in one form thereof, a movably mounted jet of electrical conducting fluid, such as water, is positioned near the edge of an object of electrical conducting material. Suitable driving means, such as an electric motor, are provided for moving the jet. A change in the position of the object with respect to the jet produces a change in the electrical conductivity between the jet and the object. This change in conductivity is utilized to control the driving means to move the jet to follow the change in position of the edge. An indicating device indicates the amount of movement of the jet from an initial position and thereby provides an indication of the position of the edge.

In illustrating the invention in one form thereof, it is shown as embodied in a system for indicating the width of a strip of hot steel.

For a better and more complete understanding of the invention, reference should now be had to the following specification and to the accompanying drawing, in which Fig. 1 is a simple, diagrammatical sketch of an embodiment of the invention and Fig. 2 is a detail of a modification.

Referring now to the drawing, a strip of material 10, such for example as a strip of hot steel, is being passed from one roll stand (not shown) of a rolling mill to a second roll stand thereof. This strip is moving in a direction which in the drawing is perpendicular to the plane of the drawing and is therefore shown in section.

For detecting and indicating the position of the right edge of the strip 10, a detecting and indicating unit is provided. This unit comprises means for projecting a pair of jets 11 and 12 of an electrical conducting fluid, such for example, as water, in proximity to the edge of the strip. Water for these jets is supplied from the usual mill supply through a flexible hose coupling and flow switch (not shown) to the nozzles 13 and 14. Preferably these nozzles are located below the plane of the strip and are mounted on a carriage 15 in spaced apart relationship with each other to provide a narrow, neutral zone, e. g., a neutral zone of approximately $\tfrac{1}{16}$ inch between the two jets at the plane of the strip 10. The nozzles 13 and 14 direct the jet in proximity to the right edge 10a of the strip so that in normal operation when the edge of the strip is stationary, the jet 12 will be projected past the edge of the strip, and the jet 11 will strike the strip and thus make electrical contact therewith. Preferably, the jets are arranged on the up-mill side of the apron plate of the mill so as to permit the scale from the strip to fall into the pit on the down-mill side of the apron plate. The jets and the carriage are arranged within a protective enclosure (not shown) which is provided with suitable openings through which the jets are directed to the proximity of the edge of the strip.

As shown, the carriage 15 is mounted on a lead screw 16 which is driven by suitable driving means, such for example, as the electric motor 17, to the rotor of which the lead screw is directly connected. Although the motor 17 may be of any suitable type, it is preferably a direct current motor provided with a direct current field winding 17a which is supplied from a suitable source. The armature of the motor is supplied from a suitable source of alternating voltage through rectifying electric valves 19 and 20. The contacts 21a of a line contactor 21 are included in the connections between the armature of the motor and the source 18.

Although the electric valves 19 and 20 may be of any suitable type, they are preferably grid controlled, mercury vapor thyratron tubes. The cathodes 19a and 20a of the valves 19 and 20 which control the supply of current to the armatures are indirectly heated, and these valves are provided with control grids 19b and 20b, respectively. As shown, electric valves 19 and 20 are connected "back to back," i. e., the anode of valve 19 is connected to the cathode 20a of valve 20, and the cathode 19a of valve 19 is connected to the anode of valve 20. As thus connected, these valves provide for supplying pulses of unidirectional current of selected polarity to the armature of the motor 17 and thereby provide for rotation of the motors in either direction when one or the other of the valves 19 and 20 is energized. If both valves 19 and 20 are simultaneously energized, pulses of unidirectional current of opposite polarity will flow through the armature during successive half-cycles of opposite polarity of the voltage wave of the source 18. Consequently, the forward and reverse torques of the motor will balance and the motors will remain at standstill.

The grid 19b is connected through a grid protective resistor and the secondary winding 22a of a grid transformer to the cathode 19a. A source of biasing potential, such for example as a battery 23, is included in the connections between the cathode and the grid and serves to apply a negative bias to the grid. The grid 20b and cathode 20a of valve 20 are similarly connected through a protective resistor, the secondary winding 24a of a grid transformer 24, and a biasing battery 25.

For the purpose of controlling the energization of valves 19 and 20, an additional pair of electric valves 26 and 27 is provided which are respectively connected in circuit with the primary windings 22b and 24b, respectively, of grid transformers 22 and 24. The primary windings 22b and 24b are connected through supply transformers 28 and 29 to suitable sources of alternating voltage 30 and 31, which sources may be and preferably are the same source as the source 18.

Although the electric valves 26 and 27 may be of any suitable type, they are preferably grid controlled, mercury vapor thyratron tubes. The cathodes 26a and 27a of the valves 26 and 27 are indirectly heated, and these valves are provided with shield grids 26b and 27b as well as with control grids 26c and 27c, respectively. In thyratron valves, such as the valves 19, 20, 26 and 27, the function of the control grid is only to initiate the flow of current between the anode and cathode during each positive half-cycle of anode voltage. Once current has started to flow, the grid exercises no further control until the conductivity of the valve has been interrupted by some means external to the valve itself. Once the current has ceased to flow, the voltage of the grid will again determine the point in the positive half-cycle of anode voltage at which the valve will again become conducting. These valves are therefore grid controlled, arc rectifiers.

The anode-cathode circuit of electric valve 26 is traced from the upper terminal of the secondary winding of supply transformer 28 through the primary winding 22b of the grid transformer 22 to the anode 26d of valve 26 and from the cathode 26a to the lower terminal of the secondary winding of transformer 28. As shown, the control grid 26c is connected through resistors 32 and 33 to the negative terminal of a battery 34, and the cathode 26a is connected to a point 34a of the battery which is positive with respect to the negative terminal and thus the grid 26c is given a negative bias with respect to the voltage of its cathode. A mid-terminal 34b of the battery is illustrated as being connected to the strip 10. However, in actual practice the connection from the midpoint 34b will be made to a part of the mill through which contact is completed to the strip 10. The junction point 32a between resistors 32 and 33 is connected by means of a conductor 35 to the nozzle 13, and thus when the jet 11 makes contact with the strip 10, the control grid 26c of valve 26 is connected through the jet 11, strip 10, and conductor 36 to the midpoint 34b of the battery which is positive with respect to the point 34a of the battery to which the cathode 26a is connected. As a result the valve 26 will be rendered conducting.

In a typical installation, the resistor 32 may have a resistance of between 50,000 and 100,000 ohms, and the resistor 33 may have a resistance of twice the resistance of the jet 11 which in a typical installation may be between 200,000 and 600,000 ohms.

The resistor 33 and jet 11 constitute adjacent arms of a bridge circuit between the cathode 26a and the control grid 26c of valve 26, and similarly, the resistor 39 and jet 12 constitute adjacent arms of a similar bridge between the cathode 27a and the grid 27c of valve 27. The specific resistance of the water jets is subject to sudden changes which produce changes in the relationship of the voltage drops across the adjacent bridge arms of these bridges, which may be of sufficient magnitude to cause false operation of the apparatus. For the purpose of avoiding such false operations, the resistors 33 and 39 may each be constituted of the flowing volume of water between two metal pipe inserts 72 and 73 in a tube 74 of rubber or other suitable insulating material through which the water flows to the associated jet as illustrated in Fig. 2. The pipe inserts 72 and 73 serve as terminals of the water resistor and are connected in the circuits in the manner in which the terminals of the resistors 33 and 39 in Fig. 1 are connected.

Thus, the water which constitutes the resistors 33 and 39 immediately subsequently constitutes the jets 11 and 12. As a result the relationships of the voltages across the adjacent arms of the bridge circuits between the cathodes and grids of valves 26 and 27 remain unaffected by any change in the specific resistance of the water constituting these arms, and thus false operation of the apparatus on this account is eliminated.

The anode-cathode circuit of the valve 27 is traced from the upper terminal of the secondary winding of supply transformer 29 through primary winding 24b of grid transformer 24 to the anode of the valve 27, and from the cathode through conductor 37 to the lower terminal of the secondary winding of supply transformer 29. The control grid 27c of valve 27 is connected through resistors 38 and 39 to the positive terminal of the battery 34, and the cathode 27a is connected to a point 34c which is more negative than the positive terminal. As a result, the grid 27c is biased positively with respect to the cathode, and the valve is normally conducting.

The resistances of resistors 38 and 39 are approximately equal to the resistances of resistors 32 and 33, respectively, and the junction point 38a of resistors 38 and 39 is connected by means of a conductor 40 to the nozzle 14. Thus, when the jet 12 is in contact with the strip 10 which is connected through conductor 36 to the midpoint 34b of battery 34, the control grid 27c will be connected through the jet and the strip to the point 34b and will thus be given a negative bias with respect to the cathode, and the valve will become non-conducting.

The apparatus thus far described constitutes a unit for detecting the position of the right edge 10a of the strip. For the purpose of detecting the position of the left edge 10b of the strip, a unit similar to the unit already described is provided. This unit comprises a pair of nozzles 41 and 42 for directing a pair of jets 43 and 44 in proximity to the edge 10b of the strip, a motor 45 for rotating the lead screw 46 which drives the carriage 47 upon which the nozzles 41 and 42 are mounted, and an electric valve amplifier apparatus 48. The electric valve amplifying unit 48 is in all respects identical with the electric valve amplifying unit which is enclosed within the dotted rectangle 49, and therefore, the unit 48 is illustrated conventionally.

For the purpose of indicating the positions and changes in positions of the edges 10a and 10b of the strip and for indicating the width and variations in the width of the strip, electric motion transmitting devices 50, 51, and 52 and an electric motion receiving device 53 are provided. The electric motion transmitting device 50 comprises a rotor member 50a which is provided with a single-phase alternating current winding (not shown) and a stator member 50b which is provided with a three-element distributed winding (not shown), which is physically similar to a polyphase winding. The rotor and stator windings of the device are in inductive relationship with each other. The single-phase rotor winding is energized from a suitable source of single-phase alternating current voltage which is indicated in the drawing by the two supply lines 54. The electrical motion receiving device 53 is in all respects identical with the transmitting device 50, and the single-phase rotor winding is connected to the source 54.

The transmitting device 51 has a rotor member 51a which is provided with a distributed three-element winding (not shown) and a stator member 51b which is also provided with a distributed three-element winding. The rotor and stator windings of this device are also in inductive relationship with each other. As indicated in the drawing, the electrical motion transmitting device 52 is in all respects identical with the device 51.

The rotor member 50a of the transmitter 50 is connected through suitable gearing to the shaft of the jet driving motor 45, and similarly, the rotor member of the transmitter 52 is connected through suitable gearing to the shaft of the jet driving motor 17. The terminals of the stator winding of the transmitter 50 are connected by means of conductors 55 to corresponding terminals of the stator windings of transmitter 51, and similarly, the terminals of the stator winding of the transmitter 52 are connected by means of conductors 56 to corresponding terminals of the rotor winding of transmitting device 51. Also, as shown, the terminals of the rotor winding of transmitting device 52 are connected to corresponding terminals of the stator winding of receiving device 53.

The motion transmitting and receiving devices 50, 51, 52, and 53 are of the self-synchronous type and thus have the following properties. If the rotors of the devices 51 and 52 are restrained and the rotor of the transmitter 50 is rotated, the rotor of the receiving device 53 will faithfully reproduce the motion of the transmitting device 50. Likewise, if the rotors of the transmitters 50 and 51 are restrained, and the rotor of the transmitting device 52 is rotated, the rotor of the receiving device 53 will reproduce the motion of the rotor of the transmitter 52. Similarly, if the rotor of the device 51 is restrained and the rotors of the transmitters 50 and 52 are rotated, the rotor of the receiving device 53 will rotate an amount equal to the algebraic sum of the motions of the transmitters 50 and 52. In other words, the connections between the devices 50, 51, 52, and 53 are so made initially that if the jet driving motors 17 and 45 are moving the jets either toward or away from each other, the receiving device 53 will rotate an amount in one direction or the other which is equal to the algebraic sum of the rotations of the transmitters 50 and 52, whereas, if the motors 17 and 45 are moving both sets of jets in the same direction along the lead screws 16 and 17 (for example to the right), the rotor of the receiver 53 will rotate an amount which is equal to the difference of the rotations of the transmitters 50 and 52. Consequently, if the motors 17 and 45 rotate both sets of jets the same amount, there will be no difference and the rotor of the receiving device 53 will remain stationary.

For the purpose of deenergizing the control when no strip is in the mill, a sensative thyratron type amplifier 58 and relay are provided for controlling the energization of the operating coil of the contactor 21. The input or grid circuit to the amplifier 58 is connected by means of conductors 58a and 58b to the strip 10 and to a nozzle 59 which directs a jet 60 against the lower surface of the strip 10. Power is supplied to the thyratron amplifier 58 from a suitable source of alternating voltage 61 which may be and preferably is the same source as the source which is indicated by the supply lines 18. When the strip 10 is in the mill in the position indicated, the input circuit to the amplifier 58 will be completed through the jet 60 and the operating coil of the contactor 21 will be energized, and the contacts 21a and 21b of the contactor will be closed to complete the armature connections of the jet driving motors 17 and 45 to the source 18.

The rotor of the transmitting device 51 is connected through suitable gearing to an odometer type indicating device 62 which is calibrated in terms of width of the strip 10. Similarly, the receiving device 53 is provided with an indicating device comprising a movable indicating pointer 63 cooperating with a dial 64 which is graduated in fractions of an inch, on opposite sides of a central zero position. Initial, the indicating apparatus is set up and adjusted so that when the jets 11, 12, and 43, 44 are correctly positioned on the edges of a strip of the width for which the dial 62 is set, the pointer 63 will indicate zero on the dial 64.

With the foregoing understanding of the apparatus and its organization in the system, the operation of the system itself will readily be understood from the following detailed description. It will be assumed in this explanation that during the previous operation, a strip of 61½ inches in width was passed through the mill, and it will further be assumed that the next strip to be passed through the mill is 61 inches in width. The indicating device 62 is set by means of the knob 62a to read 61 inches. Since the rotors of the transmitters 50 and 52 are restrained against rotation by means of the gearing, motors, lead screws, and carriages to which they are connected, rotation of the rotor of the transmitter 51 when the knob 62a is turned will cause the rotor of the receiving device 53 to rotate an amount equal to the rotation of the rotor 51a in setting the indicating device from 61½ inches to 61 inches. Rotation of the receiving device 53 will turn the indicating pointer 63 to a position such that when the jets 11, 12 and 43, 44 are moved in to the correct positions with respect to the edges of a 61-inch strip, the indicating pointer 63 will be rotated back to the zero position in which it is illustrated. In other words, the indicating pointer 63 and dial 64 are zeroed for each width of strip by rotation of the knob 62a.

When the strip 10 of assumed width of 61 inches enters the mill, the input circuit to the thyratron amplifier 58 is completed through the jet 60 and the strip and as a result, the contractor 21 closes its contacts to connect the armatures of the jet moving motors 17 and 45 to the source 18.

Since, on the previous pass, the jets 11 and 12 were spaced from the jets 43 and 44 the correct amount for a 61½-inch strip, they will be too far apart for a 61-inch strip and in general, will occupy the positions with respect to the edges of the strip 10 that are illustrated in the drawing, i. e. all four jets will be out of contact with the strip 10. Since the jet 11 is out of contact with the strip 10, the grid 26c of the valve 26 will be biased negatively with respect to its cathode and consequently valve 26 will be nonconducting. On the other hand, the grid 27c of valve 27 which is connected to the positive terminal of the battery 34 will be biased positively with respect to its cathode and the valve 27 will conduct positive half-wave impulses. These impulses will be transformed and supplied to the grid 20b of the valve 20 which will also conduct positive half-wave impulses and transmit them through the armature of the motor 17 in such a direction that the carriage 15 will be moved to the left, i. e., inwardly toward the center line of the strip 10. In a similar manner, the motor 45 will be caused to rotate in such a direction as to move the carriage 47 toward the right or inwardly toward the center line of the strip 10.

When the carriage 15 has been moved sufficiently far to the left to effect contact between the jet 11 and the strip 10, the grid 26c of valve 26 will be connected through the jet and strip 10 to the midpoint 34b of the battery 34, which point is positive with respect to the point 34a to which the cathode of valve 26 is connected, and consequently, valve 26 will become conducting and this, in turn, will render the valve 19 conducting. However, since the valve 19 supplies current impulses to the armature of the motor 17 in the opposite direction from that in which current is supplied by the valve 20, no torque will be developed and the motor will be dynamically braked to rest with the jet 11 in contact with the strip 10 and the jet 12 out of contact with the strip 10. Similarly, the motor 45 will come to rest with the jet 44 in contact with the strip 10 and the jet 43 out of contact with the strip 10.

The motors 17 and 45 in moving the jets 11 and 12 and 43 and 44 to their correct positions with respect to the edges 10a and 10b of the strip 10 rotate the rotors of the transmitters 50 and 52 corresponding amounts, and these transmitters cause the rotor of the receiving device 53 to rotate the pointer 63 to the zero position on the dial 64 when the jets are correctly positioned with respect to the strip.

If at some point in the length of the strip 10, the width should become less than 61 inches in such a manner that the right edge 10a of the strip moves out of contact with the jet 11, the positive bias is removed from the grid 26c of the valve 26 and this valve and the valve 19 ceases conducting. However, the valve 27 and the valve 20 continue to conduct, and the motor 17 is energized in a direction to move the carriage 15 inwardly toward the center line of the strip until the jet 11 again makes contact with the strip 10 at which time the valves 26 and 19 again become conducting and the motor 17 is again brought to rest. The rotation of the motor 17 rotates the transmitter 52 a corresponding amount and the rotation of the transmitter 52 is reproduced by the receiver 53 with the result that the indicating pointer 63 is moved to the left or minus side of the dial an amount corresponding to the movement of the jet 11, and therefore, an amount corresponding to the change in position of the edge 10a of the strip.

Similarly, if the left edge 10b of the strip moves away from the jet 44, the motor 45 is energized to move the carriage 47 to the right until contact is reestablished between the jet 44 and the strip 10. The rotation of the motor 45 effects a corresponding rotation of the transmitter 50 and receiver 53 with the result that the indicating pointer 63 is moved to the left a corresponding amount. Thus, the position of the pointer 63 with respect to the graduated dial 64 indicates the position of the left edge 10b of the strip. Actually, the indicating pointer in moving to the left indicates the amount of decrease in the width of the strip from 61 inches, and the rotation of either the motor 17 or the motor 45 indicates which edge of the strip has moved away from the jet with which it should be in contact.

If the width of the strip 10 decreases in a manner such that both edges 10a and 10b of the strip move away from the jets 11 and 44, both motors 17 and 45 will be simultaneously energized and will move the jet inwardly until contact is reestablished. The motors 17 and 45 in moving the jets to their correct positions will rotate both transmitters 50 and 52 simultaneously. The receiving device 53 will rotate an amount equal to the algebraic sum of the rotation of the transmitters 50 and 52, and the indicating pointer 63 will be moved to the position on the graduated scale which indicates the total decrease in the width of the strip.

If the strip increases in width in such a manner that the right edge 10a of the strip moves outwardly so that it is in contact with both jets 11 and 12, the grid 27c of the valve 27 will be connected to the point 34b which is negative with respect to the point 34c to which the cathode 27a is connected, and consequently, the valve 27 is rendered nonconducting. As a result, the valve 20 is also rendered nonconducting and ceases to supply current impulses to the armature of the motor 17. However, the valves 26 and 19 remain conducting and the valve 19 continues to supply current impulses to the motor 17 in a direction such that the motor 17 moves the carriage 15 outwardly to follow the edge of the strip. When the jet 12 is again moved out of contact with the strip 10, the negative bias is removed from the grid 27c of the valve 27, and the valves 27 and 20 again become conducting and the valve 20 supplies current impulses to the armature of the motor 17 in the opposite direction to that in which current is supplied from the valve 19, and consequently, the motor 17 again comes to rest. The rotation of the motor 17 during this operation effects a corresponding rotation of the transmitter 52 and likewise a corresponding rotation of the rotor of the receiving device 53. Since the rotation of the motor 17 was in the opposite direction from that of its rotation when the width of the strip decreased, the indicating pointer 63 will be rotated to the right and the amount of its rotation will indicate the new position of the edge 10a of the strip. If the amount of increase exceeds the amount of decrease previously described, the pointer 63 will be rotated to the right of the zero position.

If the left edge 10b of the strip moves outwardly, the result will be the same, i. e., the indicating pointer 63 will be moved to the right an amount corresponding to the change in position of the edge 10b of the strip.

If both edges 10a and 10b of the strip moved outward simultaneously, the indicating pointer 63 is moved to the right an amount equal to the algebraic sum of the movements of both edges from their initial positions.

If the width of the strip remains constant but the strip itself should be laterally displaced, e. g., to the right, the jets will be correctly repositioned with respect to the edges of the strip in the manner described in the foregoing. In this case, however, the motor 45 will rotate in a direction opposite to that in which it rotated when the edge of the strip moved to the left, as described in the foregoing.

Indications should only be read when the strip edges are stationary. The condition of the apparatus is an indication of the condition of the edge, e. g., if the edge is stationary, the jet positioning motor associated with such edge is stationary, and if the edge is moving, the motor is rotating. However, the motor is enclosed within a protective casing and thus the operator is unable to observe whether it is rotating or stationary. For the purpose of providing an indication of the condition of the jet moving motor to the operator, glow tubes 64 and 65 are connected across the armatures of motors 45 and 17, respectively. These glow tubes have two main electrodes, and a small quantity of an inert gas, such as neon, is included within the envelope. If a discharge device of this character is connected to a source of voltage, the negative electrode will glow. Thus, when the jet moving motors are rotating, one of the electrodes of each of the glow tubes 64 and 65 will glow. This condition indicates to the operator that the edge is in motion and that a reading should not be taken. However, when the motors are stationary, current impulses of opposite polarity are supplied to the motors during successive half-cycles, and thus each electrode of the glow tubes is alternately positive and negative and both electrodes of each tube glow. This indicates to the operator that the edge is stationary and that the reading may be taken.

If it is desired to transmit the indications to a plurality of remote indicating stations, additional indicating units located at such remote stations may be provided. As indicated in the drawing, these units comprise motion receiving devices 66 and 67 connected in parallel with motion receiving device 53, and associated indicating pointers and dials. Similarly, devices for indicating the strip width setting are provided at these stations. These devices comprise receiving devices 68 and 69 electrically connected to a transmitting device 70 the rotor of which is mechanically connected to the setting knob 62a. Odometer type indicating devices 70 and 71 are driven by receiving devices 68 and 69, respectively.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of the invention or from the scope of the annexed claims.

What we claim as new and desire to secure by Letters Patent of the United States is:

1. In a system for indicating the position of the edge of an object of electrical conducting material subject to movement in the direction of its width, the combination comprising means for projecting a jet of electrical conducting fluid past the edge of said object in predetermined initial positional relationship with respect thereto, means responsive to a change in the electrical conductivity between said jet and said object in response to a change in the position of said object for moving said jet to restore said initial positional relationship, and means for indicating the amount of said restoring movement.

2. In a system for indicating the position of the edge of an object of electrical conducting material subject to movement in the direction of its width, the combination comprising means for projecting a jet of electrical conducting fluid past the edge of said body and in predetermined positional relationship with respect thereto, means for moving said jet, means responsive to a change in the condition of conductivity between said jet and object following a change in the position of said edge with respect to said jet for actuating said moving means to move said jet in a direction to restore said positional relationship and responsive to the restoration of said positional relationship for terminating said movement of said jet, and means responsive to said movement for indicating the amount thereof.

3. In a system for indicating the position of the edge of an object of electrical conducting material subject to movement in the direction of its width, the combination comprising means for projecting a jet of electrical conducting fluid past the edge of said object in predetermined initial positional relationship with respect thereto, driving means for moving said jet, an electric circuit including said jet and said object, means connected to said circuit and responsive to a change in conductivity between said jet and said object following a change in position of said edge with respect to said jet for actuating said driving means to move said jet in a direction to restore said initial positional relationship, and means responsive to the movement of said jet for indicating the amount of said movement.

4. In a system for indicating the position of an edge of an object of electrical conducting material subject to movement in the direction of its width, the combination comprising means for projecting a jet of electrical conducting fluid past the edge of said object and in predetermined initial positional relationship therewith, means including an electric motor responsive to a change in the electrical conductivity between said jet and said object in response to a change in position of said edge with respect to said jet for moving said jet to a position to restore said initial predetermined relationship, and means for indicating the amount of movement of said jet.

5. In a system for indicating the width of an object of electrical conducting material that is subject to movement in the direction of its width, the combination comprising means for projecting a jet of electrical conducting fluid past each of opposite edges of said object in initial predetermined positions with respect to said edges, means responsive to changes in the electrical conductivity between said jets and said object in response to changes in position of said edges for independently moving said jets to follow said changes in position of said edges, and means for indicating the algebraic sum of the movements of said jets from said initial positions.

6. In a system for indicating the width of an object of electrical conducting material that is subject to movement in the direction of its width, the combination comprising a first means for projecting a jet of electrical conducting fluid past one edge of said object in initial predetermined position with respect to said edge, a second means for projecting a second jet of electrical conducting fluid past the opposite edge of said object, means responsive to changes in the electrical conductivity between said jets and said object in response to changes in the positions of said edges for independently moving said jets to new positions to follow the changes in positions of said edges, and means for indicating the algebraic sum of the movements of said jets from said initial positions.

7. A system for indicating the width of an object of electrical conducting material comprising in combination, means for projecting a jet of electrical conducting fluid past each of opposite edges of said object, means including a pair of electric motors separately responsive to changes in the electrical conductivity between said jets and said object in response to changes in the positions of said edges for independently moving said jets to follow the movements of said edges, and means for indicating the algebraic sum of the movements of said jets.

8. A system for indicating the width of an object of electrical conducting material comprising in combination, means for projecting a jet of electrical conducting fluid past each of opposite edges of said object, means including a pair of electric motors separately responsive to changes in the electrical conductivity between said jets and said object in response to changes in the positions of said edges for independently moving said jets to follow the movements of said edges, and means for indicating the algebraic sum of the movements of said jets comprising an electrical motion receiving device, electrical motion transmitting devices driven by said motors and electrically connected to each other and to said receiving device to transmit the algebraic sum of said movements of said jets to said receiving device and a device driven by said receiving device for indicating the amount of motion of said receiving device.

9. A device for indicating the position of the edge of an object of electrical conducting material comprising in combination, means for projecting a first jet of electrical conducting fluid past an edge of said object and for projecting a second jet of electrical conducting fluid in contact with said object, means responsive to changes in the electrical conductivity between said jets and object in response to changes in the position of said edge for moving both said jets to follow the changes in the position of said edge, and means for indicating the amount of movement of said jets.

10. A device for indicating the position of the edge of an object of electrical conducting material comprising in combination, means for projecting a first jet of electrical conducting fluid past an edge of said object and for projecting a second jet of electrical conducting fluid in contact with said object, means responsive to a movement of said edge out of contact with said second jet for moving both said jets to follow said edge and responsive to movement of said edge in the opposite direction into contact with said first jet for moving both said jets in the opposite direction to follow the changes in position of said edge, and means for indicating the amount of movement of said jets.

11. A device for indicating the position of the edge of an object of electrical conducting material comprising in combination, means for projecting a jet of electrical conducting fluid into proximity with said edge, an electric motor for moving said jet in the direction of the width of said object, electric valve means responsive to changes in the electrical conductivity between said jet and said object in response to changes in position of said edge for controlling said motor to move said jet to follow the changes in the position of said edge, and means driven by said motor for indicating the amount of movement of said jet.

12. A device for indicating the position of the edge of an object of electrical conducting material comprising in combination, means for projecting a first jet of electrical conducting fluid into contact with said object and a second jet of electrical conducting material past said edge, an electric motor for moving said jets and electric valve means responsive to contact of said object with both said jets in response to changes of position in said edge in one direction for controlling said motor to move said jets to follow said edge and responsive to interruption of contact between said jets and said object in response to movement of said edge in the opposite direction for controlling said motor to move said jets in said opposite direction to follow said edge, and means for indicating the amount of movement of said jets.

13. A system for measuring the width of an object of electrical conducting material comprising in combination, a first position indicating unit operatively associated with one edge of said object and a second position indicating unit operatively associated with the opposite edge of said object, each of said units comprising means for projecting a pair of narrowly separated jets of electrical conducting fluid so that one jet passes its associated edge of said object and the other jet makes contact with said object, an electric motor for moving said jets and electric valve means responsive to contact of said object with both said jets in response to change of position of said edge in one direction for controlling said motor to move said jets to follow said edge and responsive to interruption of contact between said jets and said object in response to change of position of said edge in the opposite direction for controlling said motor to move said jets in said opposite direction to follow said edge, and means driven by the motors of both said units for indicating the algebraic sum of the movements of the jets of both said units.

14. A device for indicating the position of an edge of an object of electrical conducting material comprising in combination, means for projecting a jet of electrical conducting fluid in proximity to an edge of said object, an electric motor for moving said jet, means responsive to a change in the conductivity between said jet and said body in response to a change in position of said edge for controlling said motor to move said jet to follow the change in position of said edge, means for indicating the amount of movement of said jet, and means for projecting a second jet into contact with an object which is in operative position with respect to said first jet, and means responsive to interruption of contact between said second jet and said object when said object moves out of operative relationship with said first jet for rendering said device inactive.

15. In a system for indicating the position of the edge of an object of electrical conducting material subject to movement in the direction of its width, the combination comprising means for projecting a jet of electrical conducting fluid past the edge of said object in predetermined initial positional relationship with respect thereto, means responsive to a change in the electrical conductivity between said jet and said object in response to a change in the position of said object for moving said jet to restore said initial positional relationship, means for compensating for changes in the resistance of said jet produced by changes in the specific resistance of said fluid, and means for indicating the amount of said restoring movement.

16. In a system for indicating the position of the edge of an object of electrical conducting material subject to movement in the direction of its width, the combination comprising means for projecting a jet of electrical conducting fluid past the edge of said object in predetermined initial positional relationship with respect thereto, driving means for moving said jet, a bridge circuit including said jet and object as one arm thereof and a resistor constituted of fluid flowing to said jet as an adjacent arm thereof for compensating for changes in the resistance of said jet produced by changes in the specific resistance of said fluid, means connected to said circuit and responsive to a change in conductivity between said jet and said object following a change in position of said edge with respect to said jet for actuating said driving means to move said jet in a direction to restore said initial positional relationship, and means responsive to the movement of said jet for indicating the amount of said movement.

LOWELL L. HOLMES, JR.
ORRIN W. LIVINGSTON.